3,325,294
GLYCERATED POLYSACCHARIDE CANDY
Philip Katz, 184–186 N. 8th St., Brooklyn, N.Y. 11211
No Drawing. Filed May 11, 1964, Ser. No. 366,623
4 Claims. (Cl. 99—134)

This invention relates to improved candies and improved methods of making candy.

In the manufacture of hard candy, a master batch of syrup is cooked for a prescribed time at a relatively high temperature, such as 290° F. The cooked syrup batch is then placed on a candy pan. Approximately ten pounds of a typical hundred pound batch is removed and the candy maker manually disperses therein, with the aid of a spatula, the necessary color and flavor as a dispersion. This is a time-consuming as well as a physically demanding task. The color is usually introduced as a paste color containing a small proportion of color in a carrier, such as salt or sugar, or as a premeasured color cube. The paste color and color cube normally contain from 10 to 22 percent of active color. After the preliminary dispersion has been made, the resulting colored syrup fraction is added to the mass. Flavoring is likewise added as a secondary operation. The colored and flavored mass is then mixed in a mechanical mixer. Since the candy mass is quite viscous, it will be appreciated that even with a mechanical mixer it is difficult to obtain uniform distribution of the color and flavor. As a result, there is usually uneven distribution of color and flavor. While the incorporation of color and flavor in the form of a solution is simpler, less costly and superior in many ways, suitable solvents have not heretofore been available for this purpose.

It should be appreciated that there are considerable limitations on constituents used in candy. In hard candies, for example, aqueous solvents may not be employed.

It has been discovered that the glycerated polysaccharides of agar and of the alginate and agaroid types are solvents for all presently approved colors. By "certified" and "approved" is meant those additives which have been approved by the Food and Drug Administration. Thus, as will be explained more fully hereinafter, the colors and flavors may be introduced into the candy in solution form. The glycerated polysaccharides are also 100 percent nutritive and thus do not adulterate the candy.

The glycerated polysaccharides of the alginate and agaroid types also act as a lubricant and wetting agent whereby plasticity is maintained, further aiding product movement in the machine. The glycerated polysaccharides of agar and of the alginate and agaroid types have been found to be nonaqueous solvents for all known certified colors. Flavors may be added to the solution of color in glycerated polysaccharides and thus, color and flavor can be distributed simultaneously through the candy mass.

A surprising advantage of using the glycerated polysaccharide color solution is that it provides a synergistic effect for the color, permitting the use of smaller amounts of color than that required for the same quantity of candy in the prior art and yet which provides candy of excellent appearance.

Still another surprising advantage of the incorporation of the glycerated polysaccharides in hard candy is that the product has enhanced gloss and sharply improved shelf life. Shelf life is used herein intending to encompass normal handling, shipping and storage conditions. Shelf life is particularly important in the candy industry to enable manufacturers to meet the seasonal demand for principal holiday occasions. The manufacturer must begin production far in advance of the season as it is not economical to provide plant facilities capable of high production so as to produce sufficient goods in a short period to meet a peak seasonal demand. For example, it is estimated that 60 to 70 percent of certain types of candy business is conducted at the retail level during the month of December. The manufacturer is limited, however, as to how far in advance he may begin production because of the limited shelf life of the present candy. The properties of the candy made in accordance with the present invention are such as to permit production to begin ten to eleven months before the retail season.

As has been explained earlier, the cooked syrup is cooled to a plastic state and then color is incorporated as a paste and dispersed employing a mechanical mixer. The resultant plastic material is then fed through a series of rollers to form a rope which is, in turn, fed through a forming machine such as a chain die, to form the candy into its final configuration, e.g., balls, buttons, forms, etc.

The rollers contain on their periphery ridges or serrations to provide greater traction. Under conventional procedures, this manifests itself in the final product as a series of ridges. It has been found that with the glycerated polysaccharide composition of this invention, distributed through the candy mass, there is a tendency for the ridges to become smoothed out during the forming operation so that the finished piece ends up smooth and glossy. The glycerated polysaccharides also act as a lubricant and wetting agent whereby plasticity is maintained further aiding the "flowing out" characteristics. The glycerated polysaccharides have been found to be nonaqueous solvents for all known certified colors. It has also been found that the flavors generally used may be incorporated into the glycerated polysaccharides together with the color and thus both simultaneously distributed through the candy mass.

In the forming of candies, as for example, in a high speed chain die machine employing conventional formulations, a "diesel" effect is often noted. This is an effect caused by generation of high heat resulting from friction effects of the die and exemplified by the caramelization of the sugar within an air pocket of the candy. As a result of some experimentation, it has been found that with the use of from two to three times the amount of the glycerated polysaccharides required for formulation of the color solution, this effect is eliminated.

The term "polysaccharides," as used in the present specification, comprehends all materials commonly so known in the art. The basic material for the polysaccharides may be agar, agaroids and alginates. Agar and agaroid types are derived from various genera and species of marine algae of the class, Rhodophysceae. Agaroids, such as derived from the Gracilaria species, have for a 1.5% solution, a minimum gelation temperature of 85° F., and a minimum gel melting temperature of 180° F. As commercially available, agar usually is furnished in a form of a dry powder. A well known and important characteristic of agar is its capacity to form gels in water solution and as is familiar to those skilled in the art, a function of agar in forming gels is a complex phenomenon dependent on a number of factors, some of which remain quite obscure. Alginates are derived from algin of all species of the class, Phaeophyceae.

EXAMPLES

*Preparation of glycerated polysaccharides*

1.5 pounds of agar was added to 100 pounds of glycerine U.S.P., and the mixture heated to 240° F. over a 30-minute period. Temperature was maintained for another 30 minutes. After cooling a clear viscous thixotropic gel resulted. The molecular weight was in excess of 500.

Preparation of standard color 10 percent solutions of various standard colors in the glycerated polysaccharides were made by combining 9 pounds of the glycerated polysaccharide with 1 pound of approved color. The glycerated polysaccharide was heated to 180 °F. to simplify the addition of the color.

Procedure A (prior art)

100 pounds of cooked syrup was placed on a candy pan. A 10-pound fraction was removed and a specified amount of 10 percent paste color was worked therein by means of a spatula. The colored fraction was then spread over the balance and the mass mixed for 6 minutes in a mechanical mixer. Fairly uniform distribution was obtained although some areas appeared richer in color than others. The procedure was repeated for various colors.

Procedure B (instant invention)

100 pounds of cooked syrup was placed on a candy pan. A glycerated polysaccharide solution containing 10 percent color was introduced into a depression and the mass mechanically mixed for 3 minutes. The color appeared uniform throughout.

In the following examples, 100 percent color additive (92 percent active color) was employed:

| Color | Grams color used per 100 lbs. candy | | Percent Color Saving |
|---|---|---|---|
| | Procedure A | Procedure B | |
| Yellow #5 | 1.4 | 1.0 | 29 |
| Red #2 | 3.5 | 3 | 14 |
| Orange (Yellow #6) | 2.0 | 1.5 | 25 |
| Green [1] | 1.4 | 1 | 29 |
| Butter Color | 2.0 | 1.5 | 25 |

[1] 7 parts Yellow #5, 4 parts Blue #1.

The samples may by Procedure B were superior in terms of gloss and clarity. Colors were much deeper and clearer. After storage for one week at 90° F. and 90% R.H., there was no apparent change in these findings.

Samples of the above, sent by parcel post between two points but 20 miles apart, showed surprising differences. The samples made by Procedure A were coated with white powder. Those made by Procedure B were bright and clear.

A covered but not hermetically sealed pint jar containing a 1-inch depth of the glycerated polysaccharide, after three months of storage at normal room temperature, has been found to be clear of any invisible evidence of mold formation. On the other hand, a similar control employing pure glycerine, resulted in a visible mold growth after but a few weeks.

Typically, between 0.3 ounce and 1 ounce of the polysaccharide per 100 pounds of hard candy may be employed for suitable results.

This corresponds to candy having 0.02 percent by weight to 0.06 percent by weight of the glycerated polysaccharide, although a range of 0.01 percent to 0.1 percent may be employed.

In using the product of this invention to introduce the flavor, the compounder need not change the formula he previously used.

The glycerated polysaccharides referred to herein have a molecular weight of at least 500 and are reaction products of glycerine and between 0.1 and 1.5% by weight of a substance selected from the group consisting of agar, alginate and agaroids, formed by heating glycerine and the polysaccharides as hereinafter described.

The quantity of flavor normally used in the formula would be employed with the glycerated polysaccharides.

There has been disclosed heretofore the best embodiments of the invention presently contemplated and it is to be understood that various changes and modifications may be made by those skilled in the art without departing from the spirit of the invention.

What is claimed is:

1. A glycerated polysaccharide consisting of the reaction product formed by heating a mixture of glycerine and a substance selected from the group consisting of agar, alginates and agaroids, said mixture containing between about 0.1 percent and 1.5 percent by weight of the said substance, the heating being at about 240° F. for about thirty minutes, until said glycerine and said substance react to form a product having a molecular weight of at least about 500.

2. A hard candy containing from 0.01 percent to 0.1 percent, by weight, of the glycerated polysaccharide of claim 1.

3. The glycerated polysaccharide of claim 1 containing from 1 percent to 20 percent, by weight, of an approved food color.

4. A hard candy containing from 0.02 percent to 0.06 percent, by weight, of the glycerated polysaccharide of claim 1.

References Cited

UNITED STATES PATENTS

| 1,388,174 | 8/1921 | Denny | 99—148 |
| 2,535,538 | 12/1950 | Koch | 99—148 X |

OTHER REFERENCES

Leffingwell et al.: The Manufacturing Confectioner, December 1938, pp. 18, 19, 20 and 38.

A. LOUIS MONACELL, *Primary Examiner.*

RAYMOND N. JONES, *Examiner.*

S. E. HEYMAN, *Assistant Examiner.*